United States Patent
Rakshit et al.

(10) Patent No.: US 10,268,831 B2
(45) Date of Patent: Apr. 23, 2019

(54) SELF-PROTECTING DEVICE

(71) Applicant: INTERNATIONAL BUSINESS MACHINES CORPORATION, Armonk, NY (US)

(72) Inventors: Sarbajit K. Rakshit, Kolkata (IN); John D. Wilson, League City, TX (US)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 14/793,800

(22) Filed: Jul. 8, 2015

(65) Prior Publication Data

US 2017/0011225 A1 Jan. 12, 2017

(51) Int. Cl.
*G06F 21/62* (2013.01)
*G06F 1/16* (2006.01)

(52) U.S. Cl.
CPC ........ *G06F 21/6218* (2013.01); *G06F 1/1652* (2013.01)

(58) Field of Classification Search
CPC ............................ G06F 21/6218; G06F 3/0482
USPC .......................................................... 726/17
See application file for complete search history.

(56) References Cited

U.S. PATENT DOCUMENTS

| | | | |
|---|---|---|---|
| 6,891,317 B2 | 5/2005 | Pei et al. | |
| 8,272,155 B2 | 9/2012 | Wang | |
| 9,405,368 B2 * | 8/2016 | Modarres | G06F 3/0412 |
| 9,476,704 B2 * | 10/2016 | Choi | G01B 21/22 |
| 9,864,410 B2 * | 1/2018 | La | G06F 1/1652 |
| 2008/0303782 A1 * | 12/2008 | Grant | G06F 1/1615 |
| | | | 345/156 |
| 2009/0237872 A1 * | 9/2009 | Bemelmans | G06F 1/1601 |
| | | | 361/679.01 |
| 2010/0188422 A1 * | 7/2010 | Shingai | G06F 3/016 |
| | | | 345/647 |
| 2010/0202040 A1 * | 8/2010 | Morgan | G02B 26/0841 |
| | | | 359/295 |
| 2010/0311494 A1 * | 12/2010 | Miller | A63F 1/18 |
| | | | 463/22 |
| 2011/0227822 A1 * | 9/2011 | Shai | G06F 1/1615 |
| | | | 345/156 |
| 2012/0242592 A1 * | 9/2012 | Rothkopf | G06F 1/1652 |
| | | | 345/173 |

(Continued)

FOREIGN PATENT DOCUMENTS

WO WO2014030947 A1 2/2014

OTHER PUBLICATIONS

Thrystan, "Samsung One Flexible Display Phone is Pulled Out of a Pen," www.concept-phones.com, Aug. 2012. Available at: http://www.concept-phones.com/samsung/samsung-flexible-display-phone-pulled-pen/. (pp. 1-5).

*Primary Examiner* — Jason K Gee
*Assistant Examiner* — Dereena T Cattungal
(74) *Attorney, Agent, or Firm* — Tutunjian & Bitetto, P.C.; Kurt Goudy

(57) ABSTRACT

A self-protection device includes a flexible display having a display side. One or more actuating devices are arranged on a back side of the flexible display opposite the display side. A monitoring mechanism is configured to monitor one or more conditions such that if a triggering event occurs, the monitoring mechanism triggers the one or more actuating devices to obtain a self-protecting pose to protect the flexible display.

20 Claims, 5 Drawing Sheets

(56) References Cited

U.S. PATENT DOCUMENTS

| | | | |
|---|---|---|---|
| 2012/0315881 A1* | 12/2012 | Woloshyn | G06F 3/0488 455/412.2 |
| 2014/0334076 A1* | 11/2014 | Baldwin | H04M 1/0268 361/679.01 |
| 2016/0048370 A1* | 2/2016 | Zenoff | G06F 3/1454 715/734 |
| 2016/0270208 A1* | 9/2016 | Bostick | H05K 5/0217 |
| 2016/0320871 A1* | 11/2016 | Li | G06F 3/041 |

* cited by examiner

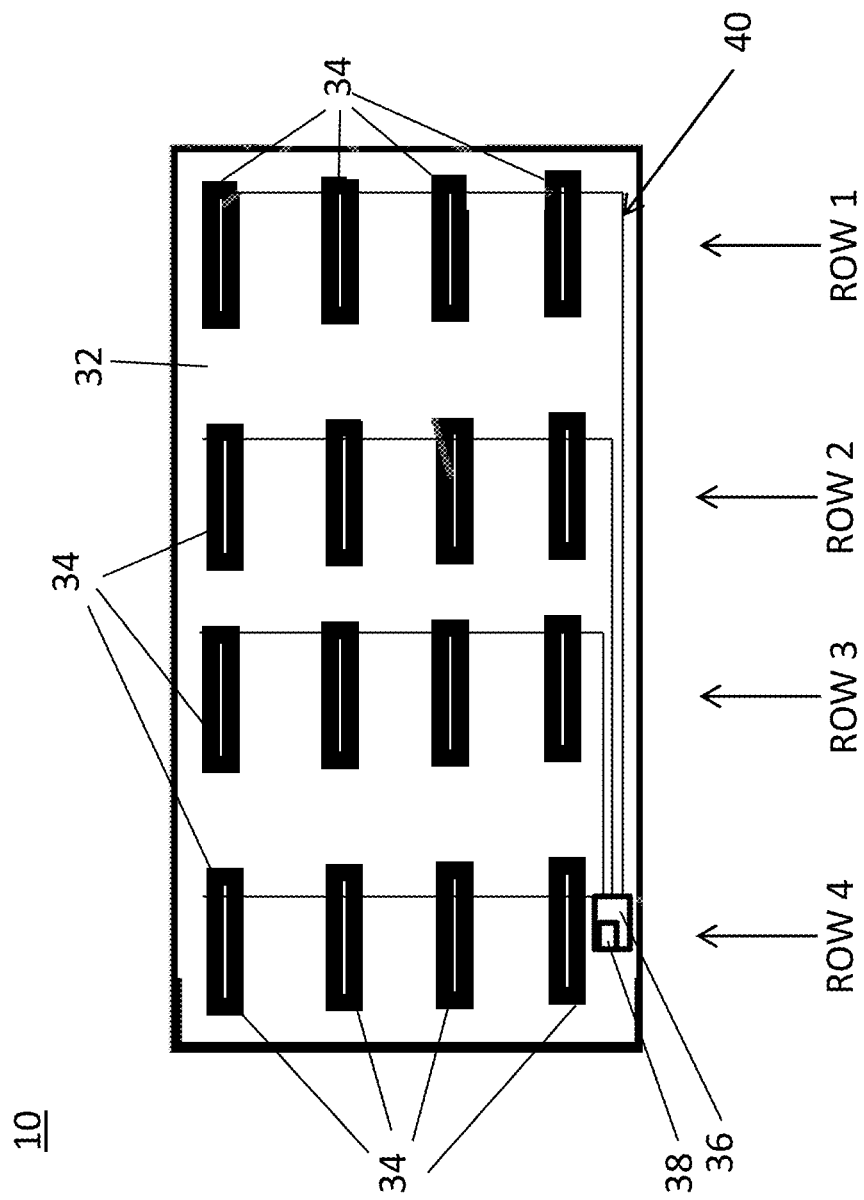

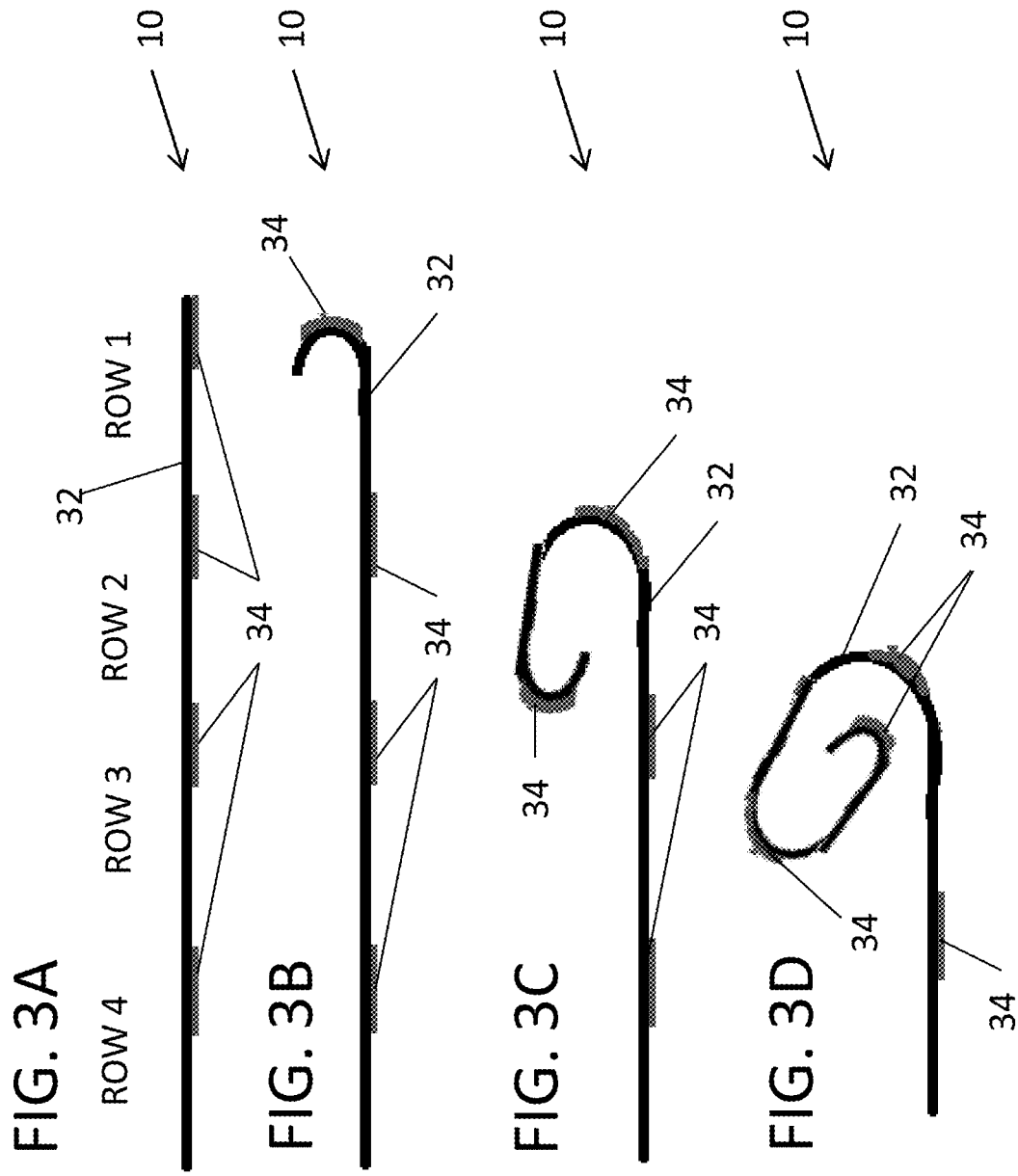

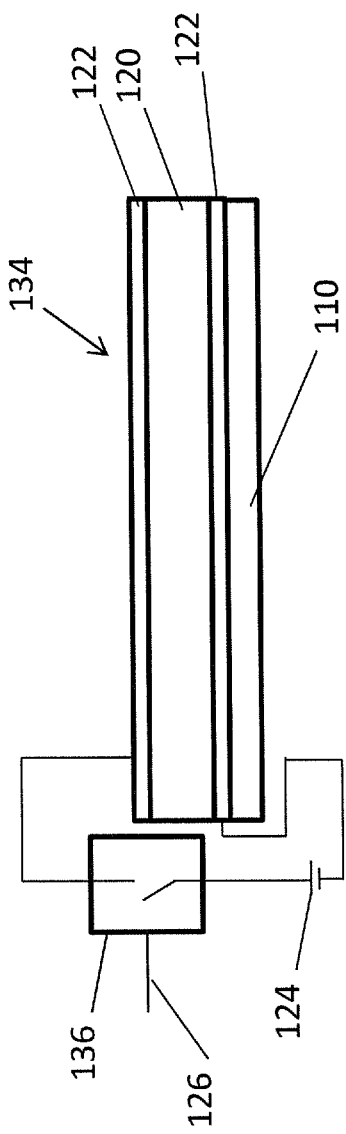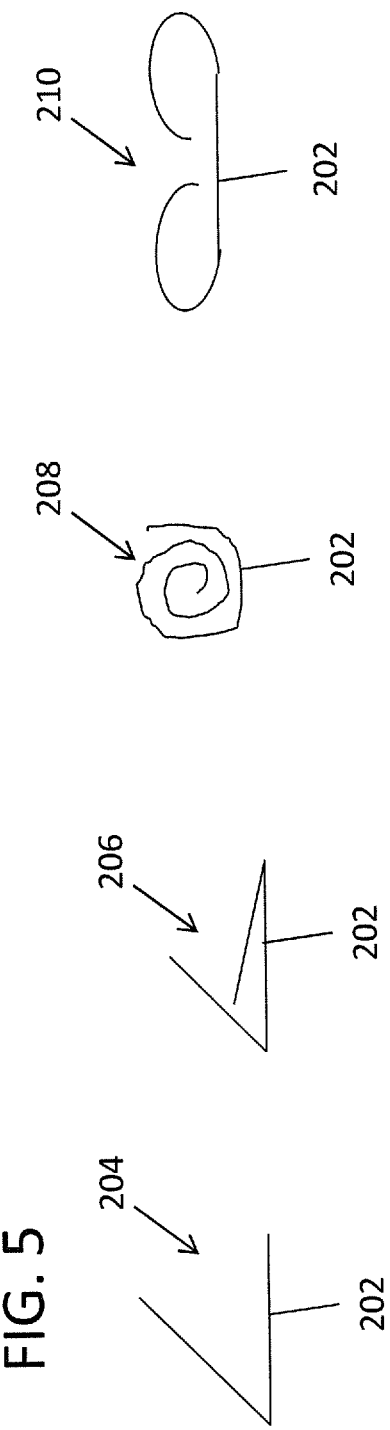

SELF-PROTECTING DEVICE

BACKGROUND

Technical Field

The present invention relates to electronic devices, and more particularly to self-protecting devices that automatically close to protect themselves from damage or to prevent display of sensitive materials.

Description of the Related Art

Flexible displays provide a media capable of being deformed to reduce size and permit easy storage. The use of flexible displays is of increasing interest with the advent of portable electronic technology. One example, of a flexible display includes electronic-paper, which is very thin and comparatively larger in dimension than handheld displays for smartphones and the like. Because the electronic paper is thin, it may be subject to damage if not properly stored once its use is completed. In this case, if the display of the electronic-paper is not folded, then dust may accumulate on the screen and its surface may be damaged by environmental conditions or hazards (e.g., sunlight, unintended contact, etc.).

SUMMARY

A self-protection device includes a flexible display having a display side and one or more actuating devices arranged on a back side of the flexible display opposite the display side. A monitoring mechanism is configured to monitor one or more conditions such that if a triggering event occurs, the monitoring mechanism triggers the one or more actuating devices to form a self-protecting pose to protect the flexible display.

Another self-protection device includes a flexible display having a display side and a back side opposite the display side. An actuation system is provided on the back side including one or more actuating devices arranged in a configuration on the back side of the flexible display and a control circuit for controlling an actuation order of the one or more actuating devices to enable the display to achieve a self-protection pose by hiding the display side using the back side. A monitoring mechanism is configured to monitor one or more conditions such that if a triggering event occurs, the monitoring mechanism signals the control circuit to enable the one or more actuating devices to move the display into the self-protecting pose to protect the flexible display.

A method for self-protecting a display device includes providing one or more actuating devices arranged on a back side of a flexible display, the back side being opposite a display side; monitoring one or more conditions of the flexible display to determine if a triggering event occurs; and if the triggering event occurs, activating the one or more actuating devices to hide the display side to obtain a self-protecting pose to protect the flexible display.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 2 is a back view showing a back side of a flexible display with actuator strips in accordance with the present principles;

FIGS. 3A-3D show side views of a flexible display with progressive actuation of actuator strips to roll or fold the flexible display in accordance with the present principles;

FIG. 4 is a schematic diagram showing an illustrative actuator strip in accordance with the present principles;

FIG. 5 is a diagram showing a plurality of possible self-protective poses of a flexible display in accordance with the present principles.

DETAILED DESCRIPTION OF PREFERRED EMBODIMENTS

Figure 1:
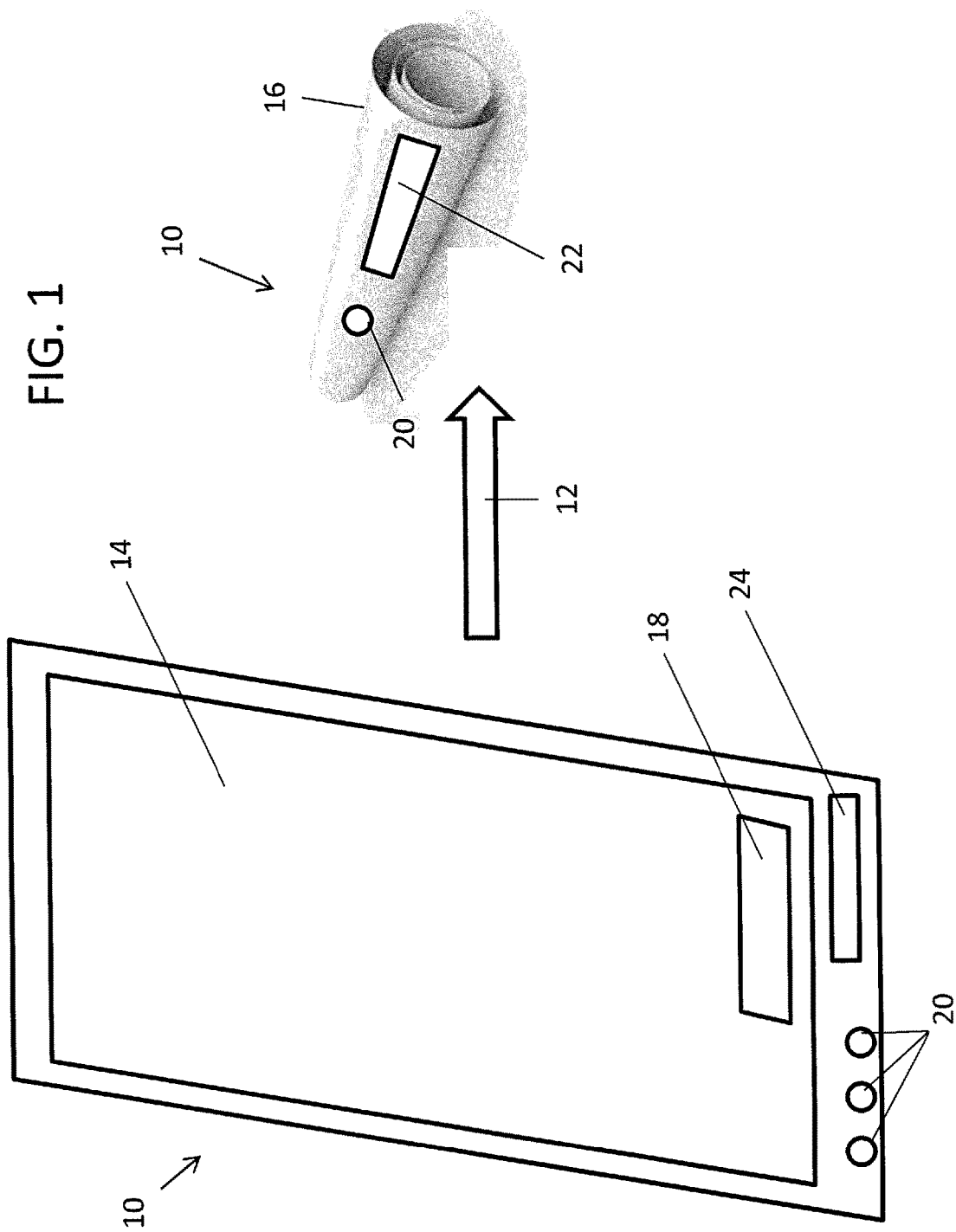
FIG. 1 is a diagram showing a physical change in a flexible display in accordance with a triggering event in accordance with the present principles.

In accordance with the present principles, devices, systems and methods are provided for self-protecting devices. Self-protecting devices may include many forms; however, particularly useful embodiments, include a thin electronic flexible display. The flexible display includes a capability to roll up or otherwise fold itself in the event of an automatic trigger. The trigger may include a plurality of different events and may include combinations of events. Some examples of triggering events may include, e.g., a threshold limit of time has elapsed where a display device is unattended, then the flexible display (e.g., electronic paper) will roll up automatically and the display area will be protected. In another example, the flexible device may be configured to roll or unroll by applying features from a rolling option menu.

In another example, if content inappropriate for a particular location is opened then the device will be rolled automatically. Once any unauthorized user enters a place or location then the device may be rolled automatically. In another example, an unauthorized user will be unable to un-roll the display. In yet another example, a sensor may be installed in the device that will identify environmental parameters and accordingly will protect the display automatically by rolling the display. The flexible device or a device with a flexible display may be configured with protection capability using hardware, software or a combination of both to protect the display.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that the present invention may be described in terms of a given illustrative architecture having a flexible substrate display; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to the drawings in which like numerals represent the same or similar elements and initially to FIG. 1, an illustrative diagram shows a flexible display 10 configured to react (e.g., roll up or fold) in accordance with a trigger condition 12. The flexible display 10 may include electronic paper although other thin film flexible display technologies may be employed, e.g., thin film transistor (TFT) liquid crystal display (LCD) with flexible polymer substrates, etc. Electronic paper or e-paper is a display technology that mimics the appearance of ordinary ink on paper. Electronic paper displays reflected light similarly to paper. Flexible electronic paper employs polymeric substrates and electronics for a display backplane.

Once the trigger condition or event is detected the flexible display 10 reacts by rolling up or folding to protect a display portion 14 of the device 10 by taking a self-protection position or pose 16. The triggering event 12 may include one or more of the following: a change in location, inactivity of the display for a threshold period of time (no motion, no contact by the user), access to information that a present user is unauthorized to access (e.g., a child accessing work documents, child accessing inappropriate materials, a user opening personal items of another user, a user opening materials without appropriate clearance, etc.), content inappropriate for a particular location, environmental conditions (e.g., too much sunlight, wet conditions (rain), temperature, etc.); etc.

In another example, the flexible display or device 10 may be configured to roll or unroll by applying a rolling option menu 18. The rolling option menu 18 provides user settings to set conditions for permitting the roll up or roll out of the display 10.

The rolling options menu 18 provides a drop down menu or the like to set the conditions under which access can be granted (e.g., unroll the display) or denied using controls, keypads or interfaces 24. In addition, the rolling options menu 18 can be employed to set the conditions under which the display goes into a self-protection mode and rolls or folds up to prevent interaction of the display portion 14 of the display 10. For example, an unauthorized user will be unable to un-roll the display without a password or other security measure being complied with. In some embodiments, one or more sensors 20 may be installed in or on the display 10 (or other location) that will identify environmental parameters, such as lighting conditions, temperature conditions, humidity or wet conditions, noise or sound conditions, movement, etc. and accordingly will protect the display automatically by rolling the display. The one or more sensors 20 may include a photosensor, a microphone, a thermocouple, an accelerometer, a barometer, a hygrometer, any other sensor(s) or combinations thereof.

The rolling option menu 18 can provide settings in which the display 10 can be rolled automatically. For example, the display 10 will be rolled automatically, if it is unattended for a certain duration or the environment is not favorable to the display. Likewise settings may be employed where the display 10 unrolls automatically, e.g., when favorable conditions are restored (e.g., the display is attended to, the environmental conditions change, etc.).

In one embodiment, a keypad 22 (and/or sensors) may be provided on an exterior surface of the display 10 in the self-protection position 16. In this way, a code or information may be input to the display to enable the display 10 to roll out and permit access.

Referring to FIG. 2, in one embodiment, a display 10 may include a back surface 32 having actuators or actuator strips 34 formed on or applied to the back surface 32. The back surface 32 is on an opposite side of the display 10 from the display portion 14. The actuator strip or strips 34 are configured to expand to begin or continue to roll the display 10 and contract when the display 10 is to be unrolled. In one embodiment, the strips 34 may include an electroactive polymer (EAP).

EAPs are polymers that exhibit a change in size or shape when stimulated by an electric field. EAPs can undergo a large amount of deformation while sustaining large forces. EAPs can exhibit large strains (e.g., several hundred percent). An example, of EAP material may include polyvinylidene fluoride (PVDF). In other embodiments, dielectric elastomer actuators (DEA) and ionic polymer-metal composites may be employed as actuators.

EAP strips 34 roll the display 10 when an electric field is applied. Little energy is needed to actuate the EAP strips 34, e.g., a single flat disk cell battery (e.g., a watch battery) or other power source 38 can be enough to supply power and roll the display 10.

A control circuit 40 may be controlled using software, logic components or other circuit elements (TFTs, multiplexers, etc.) and employed to synchronize activation (or deactivation) of the actuators 34. A switch or multiplexer 36 may be employed to deliver electrical energy to each strip/actuator 34. The switch or multiplexer 36 provides energy to one or more rows at a time. Strips 34 in each row (Row 1, Row 2, Row 3 and Row 4) are activated concurrently to create a hinge or bend location to bend or roll the display 10.

Referring to FIGS. 3A-3D, display 10 is shown at various points in the rolling process. FIG. 3A shows the display 10 in a flat configuration where there is no electric field on the strips 34. The display 10 will roll gradually. The rolling will progress from the strips 34 in Row 1 (FIG. 3B) being actuated followed by the strips 34 in Row 2 (FIG. 3C), Row 3 (FIG. 3D) and Row 4 being actuated.

In one embodiment, after a trigger event or condition is encountered, the display 10 roll up is initiated when software running on a device (e.g., the display 10) applies voltage in Row 1, once the bending of the Row 1 portion is confirmed, then voltage will be applied in Row 2 and then the Row 2 section will bend and so on.

EAP material strips 34 are fixed at the backside 32 of the display 10. Multiple rows of strips 34 are preferred. Once the voltage is applied, the strips 34 will bend. The electric field will be applied in the strips 34 of Row 1, and accordingly the bending of the strips 34 in Row 1 is carried out. As the strips 34 are fixed to the display 10, the display 10 bends with the strips 34. Once the display 10 confirms the Row 1 portion is bent, the voltage will be applied in Row 2 using the switch 36 (FIG. 2, see also switch 136 in FIG. 4), and accordingly the display 10 will start rolling. Rolling continues with voltage being applied to successive rows of strips 34, and rolling is continued. The rolling event may be detected automatically or with a manual trigger.

It should be understood that the display 10 may be folded rather than rolled. For example, a bi-fold or tri-fold arrangement may be employed, angled folds may be employed, etc. In addition, the number of rows and the configurations of the strips 34 may be arranged in any useful configuration. Further the number of rows of strips 34 may be less than or greater than the illustratively described four rows. The size and placement of the strips 34 may be employed to determine how tight the display rolls up.

The rolling of the display 10 will be completed, once all the EAP stripes 34 are expanded. The display 10 will remain rolled as long as an electrical field remains on the strips 34. To open the display 10, the electrical field may be turned off or its polarity may be reversed to drive the display 10 open, or a biasing force (e.g., spring) may drive the display 10 open in the absence of an electric field.

Referring to FIG. 4, an illustrative schematic diagram shows a strip 134 (or strip 34) in accordance with one exemplary embodiment. The strip 134 includes an EAP material layer 120 between two thin electrodes 122. The electrodes 122 are connected to a simple circuit powered by a battery 124. A switch circuit or switch 136 is controlled through input 126 by software (manually or through control circuit 40) based upon the monitored conditions as described above. The switch 136 is closed when the strip 134 is to roll up. The switch 136 may include transistors (e.g., TFTs) that form a multiplexing circuit, a logic circuit, etc. Switch 136 may include a hardware only embodiment where the switch circuit 136 includes a sensor connected to the input 126 and the switch circuit 136 is designed or programmed to react to a triggering event.

In one embodiment, a thicker material 110 is employed as a spring or biasing device to resist bending to permit recovery of the strip 134 after the electric field (switch 136 is opened) is turned off. The material 110 may include steel, a polymer or other elastic material.

It should be understood that while strips 34 and 134 are described, other actuators or configurations may be employed in addition to or instead of strips 34, 134. For example, depending on the flexibility of the display material, only one long strip may be needed. The strips 34, 134 may have the capability to roll up based on various asymmetric electrode and/or strip configurations. Another approach may employ small servos instead of strips. The servos may be employed to manipulate a mechanical structure to fold the displays (e.g., hinged sections), or two arms may be employed to close and fold the display at its center. Another embodiment may be based on a spring and catch. The user unfolds or unrolls the display, this loads up a spring with a latch and the display is held open, then the latch could be released electromechanically and the stored spring energy folds the display or rolls it back up. Other combinations of mechanical structures and thin film actuators may also be employed.

Referring to FIG. 5, a plurality of illustrative self-protecting poses is shown for the rolling/folding of a flexible display 202 in accordance with the present principles. A pose 204 shows a single fold (bi-fold) in a center portion of the display 202. A pose 206 shows two folds (tri-fold) in the display 202. A pose 208 shows a single curled or rolled display 202. A pose 210 shows a double curled display 202, where edges roll to a central position. Other poses, combinations of poses and configurations are also contemplated.

In one embodiment, a display (202) may be capable of a plurality of poses and the pose assumed may be as a result of a preprogrammed condition or trigger event. For example, if the display is left unattended for a duration, the display 202 may assume pose 202; while if inappropriate content is displayed, the display 202 may assume pose 208. Other combinations or settings may be employed and may be programmed using an options menu.

Figure 6:
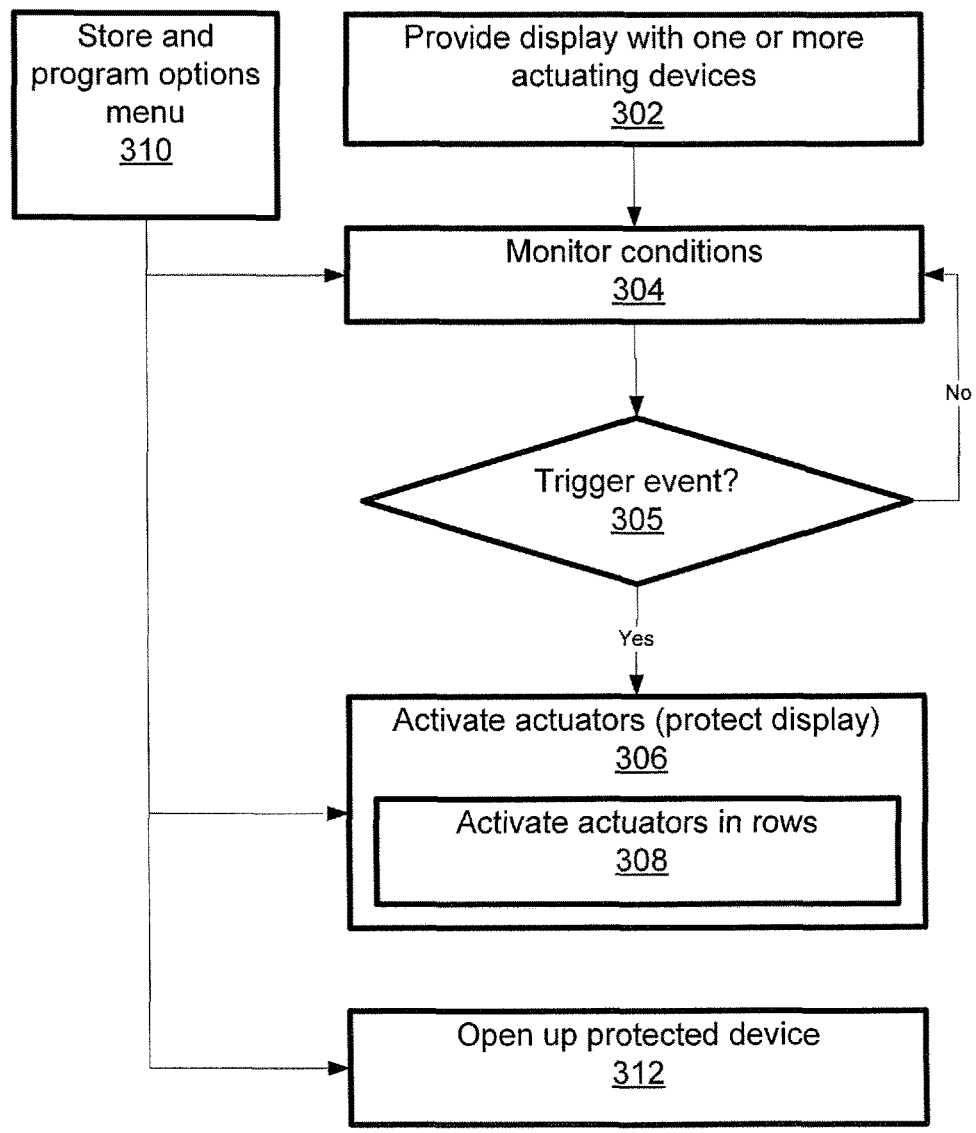
FIG. 6 is a block/flow diagram showing a method for self-protecting a display device in accordance with illustrative embodiments.

Referring to FIG. 6, a method for self-protecting a display device is illustratively shown. In block 302, one or more actuating devices are provided and arranged on a back side of a flexible display. The back side is opposite a display side of the display device. In block 304, one or more conditions of the flexible display are monitored to determine if a triggering event occurs. In block 305, a determination is made as to whether a triggering event has occurred. This determination may be made continuously or intermittently.

In block 306, the one or more actuating devices are activated to hide the display side using the back side to obtain a self-protecting pose to protect the flexible display. In block 308, activating the one or more actuating devices includes activating a plurality of actuating devices a row at a time to form a curl or bend in the flexible display.

In block 310, an options menu is stored in memory and is programmed by a user to associate trigger events with corresponding self-protection poses to be taken in response to the triggering events. This can be performed at any time. The triggering events may include one or more of: an elapsed duration of being unattended, a display of material designated as inappropriate, an action by an unauthorized user, an environmental condition status and an entry into a new location. Other triggering events may be employed. The options menu may also permit the programming of combinations of responses or include default responses (which may be changed by a user).

The device may have criteria for triggering events, e.g., an unattended display may be measured using an accelerometer to determine movement, keys strokes or commands entered, etc. Inappropriate subject matter may be determined based on security levels of documents, blocked websites, website categories, blocked file lists, other security measures, etc. Actions such as entry into an electronic folder, accessing sensitive material, failed attempts to log in, etc. may all be examples of actions by an unauthorized user that can be triggering events. Environmental condition status may include change in temperature, pressure, humidity (getting wet), incident light, shaking of the display, noise, etc. An example of entry into a new location that may be a triggering event, may include leaving a secured building, entering a public area, etc. Other triggering events are also contemplated.

In block 312, the display may be opened or unrolled using a security code or may be opened when the condition or conditions have changed. This may include deactivating or reversing the actuators. The opening up of the display may be based upon the options menu settings and may be triggered in a same way and rolling up the display. In on embodiment, the options menu settings may be employed to correlate trigger events with actions (e.g., poses), to set parameters for the triggering events, to set conditions for roll up and unroll events, etc.

Having described preferred embodiments of a self-protecting device (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A self-protection device, comprising:
a flexible display having a display side;
one or more actuating devices arranged on a back side of the flexible display opposite the display side; and
a monitoring mechanism configured to monitor one or more conditions such that if a triggering event occurs, the monitoring mechanism triggers the one or more actuating devices to bend the flexible display to firm a self-protecting pose to protect the flexible display such that the self-protecting pose shields the display side from being viewed.

2. The device as recited in claim 1, wherein the one or more actuating devices include electroactive polymer strips.

3. The device as recited in claim 1, wherein the one or more actuating devices includes a plurality of actuating devices distributed in rows such that a row forms a bend in the flexible display when the plurality of actuating devices are activated.

4. The device as recited in claim 3, wherein the monitoring mechanism activates the actuating devices a row at a time.

5. The device as recited in claim 1, wherein the one or more actuating devices expand to roll or fold the display to prevent access to the display by hiding the display side using the back side.

6. The device as recited in claim 1, further comprising an options menu stored in memory and configured to be programmed by a user to associate trigger events with corresponding self-protection poses to be taken in response to the triggering events.

7. The device as recited in claim 1, wherein the self-protection pose includes at least one of roiling up the display or folding the display.

8. The device as recited in claim 1, wherein the triggering event includes one or more of: an elapsed duration of being unattended, a display of material designated as inappropriate, an action by an unauthorized user, an environmental condition status and an entry into a new location.

9. The device as recited in claim 1, further comprising a mechanism to permit the self-protecting pose to be released to expose the display side.

10. A self-protection device, comprising:
a flexible display having a display side and a back side opposite the display side;
an actuation system provided on the back side including:
one or more actuating devices arranged in a configuration on the back side of the flexible display; and
a control circuit for controlling an actuation order of the one or more actuating devices to enable the display to achieve a self-protection pose by bending the flexible display to hide the display side using the back side; and
a monitoring mechanism configured to monitor one or more conditions such that if a triggering event occurs, the monitoring mechanism signals the control circuit to enable the one or more actuating devices to move the display into the self-protecting pose to protect the flexible display.

11. The device as recited in claim 10, wherein the one or more actuating devices include electroactive polymer strips.

12. The device as recited in claim 10, wherein the one or more actuating devices include a plurality of actuating devices distributed in rows such that a row forms a bend in the flexible display when the plurality of actuating devices are activated, wherein the control circuit activates the actuating devices a row at a time.

13. The device as recited in claim 10, wherein the one or more actuating devices expand to roll or fold the display to prevent access to the display.

14. The device as recited in claim 10, further comprising an options menu stored in memory and configured to be programmed by a user to associate trigger events with corresponding self-protection poses to be taken in response to the triggering events.

15. The device as recited in claim 10, wherein the self-protection pose includes at least one of rolling up the display or folding the display.

16. The device as recited in claim 10, wherein the triggering event includes one or more of: an elapsed duration of being unattended, a display of material designated as inappropriate, an action by an unauthorized user, an environmental condition status and an entry into a new location.

17. The device as recited in claim 10, further comprising a mechanism to permit the self-protecting pose to be released to expose the display side.

18. A method for self-protecting a display device, comprising:
providing one or more actuating devices arranged on a back side of a flexible display, the back side being opposite a display side;
monitoring one or more conditions of the flexible display to determine if a triggering event occurs; and
if the triggering event occurs, activating the one or more actuating devices to bend the flexible display to to hide the display side to obtain a self-protecting pose to protect the flexible display such that the self-protecting pose shields the display side from being viewed.

19. The method as recited in claim 18, wherein the activating the one or more actuating devices includes activating a plurality of actuating devices a row at a time to form a curl or bend in the flexible display.

20. The method as recited in claim 18, further comprising storing an options menu in memory and configuring the options menu to be programmed by a user to associate trigger events with corresponding self-protection poses to be taken in response to the triggering events, wherein the triggering events include one or more of: an elapsed duration of being unattended, a display of material designated as inappropriate, an action by an unauthorized user, an environmental condition status and an entry into a new location.

* * * * *